George G. Carver's Egg Beater.

**PATENTED
DEC. 3 1867**

71696

UNITED STATES PATENT OFFICE.

GEORGE G. CARVER, OF ROXBURY, MASSACHUSETTS.

IMPROVED EGG-BEATER.

Specification forming part of Letters Patent No. 71,696, dated December 3, 1867.

*To all persons to whom these presents shall come:*

Be it known that I, GEORGE G. CARVER, of Roxbury, in the county of Norfolk and State of Massachusetts, have invented a new and useful Egg-Beater; and do hereby declare the same to be fully described in the following specification and represented in the accompanying drawings, of which—

Figure 1:
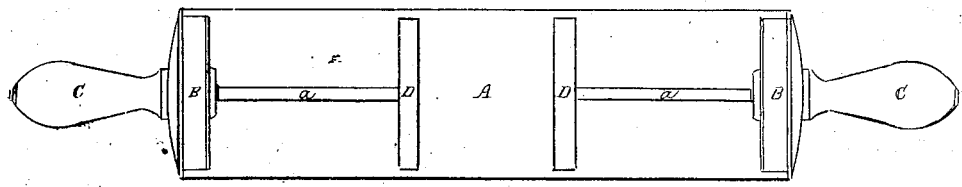
Figure 2:
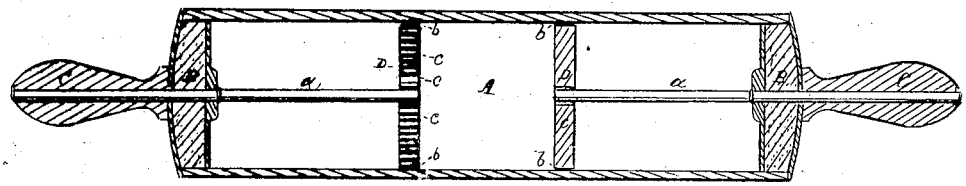
Figure 3:
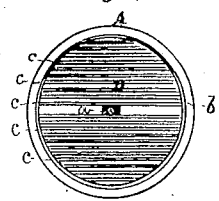

Figure 1 is a side elevation, Fig. 2 a longitudinal section, and Fig. 3 a transverse section, of it.

In such drawings, A denotes a glass tube, cylindrical in form and open at each end. B B' are stoppers or heads to fit closely into the tube at its opposite ends, each stopper being provided with a handle, C, extended from it in manner as represented.

A rod, $a$, projects inward from each of the heads B B', and carries on its inner end a stirrer, D, composed of an annulus, $b$, and a series of bars, $c\,c\,c$, extended parallel to each other across the annulus.

The bars of one stirrer I arrange at, or about at, right angles with those of the other, there being spaces between the several bars of each stirrer.

The egg-beater so constructed will not only serve as a means of breaking up and commingling the yolks and whites of eggs, but it may be used as a roller or rolling-pin for spreading or rolling out dough.

In using the egg-beater so made we first put the fluid parts of the eggs into the tube, after having removed one of its heads or stoppers. Next, the said head or stopper should be restored to place, and the apparatus should be shaken or quickly moved forward and backward in directions of its length. The albumen and yolks of the eggs will be driven together through the stirrers, and by them will be broken up and thoroughly mixed or beaten.

I claim—

1. The combination of the two handles with the glass tube and the heads or stoppers and the stirrers, arranged within such tube, substantially as hereinbefore specified.

2. I claim the combination of each stirrer, as composed of the annulus, the series of parallel cross-bars, and the rod extended therefrom, with the movable head or stopper, to fit into the glass tube, as specified.

GEO. G. CARVER.

Witnesses:
R. H. EDDY,
F. P. HALE, Jr.